(12) United States Patent
Meier et al.

(10) Patent No.: US 9,599,999 B2
(45) Date of Patent: *Mar. 21, 2017

(54) METHOD FOR EARLY DETECTION AND ANTICIPATORY CONTROL OF CONSUMER-END LOAD SHEDDING IN AN ELECTRICAL GRID, AND APPARATUS FOR CARRYING OUT THE METHOD

(71) Applicant: Alstom Technology Ltd, Baden (CH)

(72) Inventors: Marcel Meier, Gebenstorf (CH); Christian Stockmann, Lauchringen (DE); Erhard Liebig, Laufenburg (DE); Jose Taborda, Kirchdorf (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 220 days.

This patent is subject to a terminal disclaimer.

(21) Appl. No.: 13/904,108

(22) Filed: May 29, 2013

(65) Prior Publication Data

US 2013/0261820 A1    Oct. 3, 2013

Related U.S. Application Data

(63) Continuation of application No. 12/847,097, filed on Jul. 30, 2010, now Pat. No. 8,498,751.

(30) Foreign Application Priority Data

Jul. 30, 2009    (CH) .......................... 1193/09

(51) Int. Cl.
*G05D 11/00*    (2006.01)
*H02P 9/04*    (2006.01)
(Continued)

(52) U.S. Cl.
CPC ............ *G05D 11/00* (2013.01); *H02P 9/04* (2013.01); *H02P 9/102* (2013.01); *H02P 2101/10* (2015.01)

(58) Field of Classification Search
CPC ....................................... G05B 15/00
(Continued)

(56) References Cited

U.S. PATENT DOCUMENTS 3,601,617 A    8/1971    De Mello
4,742,288 A    5/1988    Sugimoto et al.
(Continued)

FOREIGN PATENT DOCUMENTS

CN    1104077 C    3/2003
CN    1419728 A    5/2003
(Continued)

OTHER PUBLICATIONS

Machine Translation of WO 95/05026.*
(Continued)

*Primary Examiner* — Ryan Jarrett
(74) *Attorney, Agent, or Firm* — Buchanan Ingersoll & Rooney PC

(57) ABSTRACT

A method for early detection and anticipatory control of consumer-end load shedding in a single-phase or polyphase electrical grid supplied with single phase or polyphase by at least one generator driven by at least one rotating machine includes measuring a current and a voltage between the at least one generator and the electrical grid and/or a current and a voltage in the electrical grid, deriving at least one signal from the measured current and voltage and using the at least one derived signal to act on the at least one rotating machine.

11 Claims, 7 Drawing Sheets

(51) Int. Cl.
  *H02P 9/10* (2006.01)
  *H02P 101/10* (2015.01)
(58) Field of Classification Search
  USPC .......................................................... 700/287
  See application file for complete search history.

(56) References Cited

U.S. PATENT DOCUMENTS

| | | | |
|---|---|---|---|
| 5,006,781 A | 4/1991 | Schultz et al. | |
| 5,547,337 A | 8/1996 | Fork et al. | |
| 6,100,809 A * | 8/2000 | Novoselsky et al. | 340/682 |
| 2002/0053889 A1* | 5/2002 | Gold | 318/154 |
| 2003/0107349 A1* | 6/2003 | Haydock et al. | 322/28 |
| 2004/0138835 A1* | 7/2004 | Ransom et al. | 702/62 |
| 2007/0012492 A1* | 1/2007 | Deng et al. | 180/65.1 |
| 2007/0282547 A1* | 12/2007 | Howell et al. | 702/60 |
| 2008/0077336 A1* | 3/2008 | Fernandes | 702/57 |
| 2009/0083019 A1* | 3/2009 | Nasle | 703/18 |
| 2009/0099832 A1* | 4/2009 | Nasle | 703/18 |
| 2009/0216910 A1* | 8/2009 | Duchesneau | 709/250 |
| 2010/0292853 A1* | 11/2010 | McDonnell | 700/287 |

FOREIGN PATENT DOCUMENTS

| | | |
|---|---|---|
| DE | 3438452 A1 | 3/1986 |
| DE | 10328932 A1 | 1/2005 |
| JP | 2007-288847 A | 11/2007 |
| WO | 95/05026 A1 | 2/1995 |
| WO | WO 9505026 A1 | 2/1995 |
| WO | 98/28832 A1 | 7/1998 |

OTHER PUBLICATIONS

International Search Report for CH11932009 mailed Mar. 8, 2010.
European Search Report for EP 10 17 0253, dated May 24, 2011.
First Office Action issued on Oct. 18, 2013, by the Chinese Patent Office in corresponding Chinese Patent Application No. 201010248732.4.
Japanese Office Action (Notification of Reason(s) for Refusal) dated Jun. 2, 2014, issued in corresponding Japanese Patent Application No. 2010-172417, and English language translation of Office Action. (6 pages).

* cited by examiner

METHOD FOR EARLY DETECTION AND ANTICIPATORY CONTROL OF CONSUMER-END LOAD SHEDDING IN AN ELECTRICAL GRID, AND APPARATUS FOR CARRYING OUT THE METHOD

CROSS REFERENCE TO PRIOR APPLICATIONS

This application is a continuation of U.S. patent application Ser. No. 12/847,097, which claims priority to Swiss Application No. CH 01193/09, filed Jul. 30, 2009, the entire disclosure of each being incorporated by reference herein.

FIELD

The present invention relates to the field of power generation. It relates in particular to a method for early detection and anticipatory control of consumer-end load shedding in an electrical grid. It also relates to an apparatus for carrying out the method.

BACKGROUND

The power which is generated in electrical grids must equal the demanded power. If equilibrium is suddenly lost, by consumers being switched off or on, grids being disconnected or electricity generating installations being switched off, this loss of equilibrium must be compensated by suitable measures. If very major changes occur suddenly, this places stringent demands on the grid regulation and individual regulation of the individual electricity generating installations. In particular, major consumers or entire grid elements being switched off represents a hazard to the electricity generating installations. When the torque of the consumers is disconnected from the electricity generating installations by circuit breakers being opened, the rotating electricity generating installations start to accelerate, corresponding to their intrinsic mass moments of inertia. If no suitable measures are taken, the electricity generating installations accelerate to their maximum permissible rotation speed, and are switched off by the safety devices.

Systems which prevent impermissible overspeeding after load shedding in an electrical grid are known, for example, from the document U.S. Pat. No. 3,601,617. The methods proposed therein use a rotation speed measurement and the rotation speed change derived therefrom as a main variable. As soon as the rotation speed and the acceleration linked to it have exceeded an installation-typical value, measures are introduced to reduce the drive power. In order to detect an increase in rotation speed correctly as a consequence of consumer-end load shedding in an electrical grid, further process variables such as temperature, pressure, flow etc. as well as electrical variables such as power, voltage, current etc. are measured and are included in the evaluation logic. Furthermore, the switches in the electrical grid are also monitored and are included in the logic. The critical factor is that this prior art cannot dispense with the "mechanical" rotation speed measurement as a substantial variable.

These known measures and methods have the disadvantage that reaction is impossible before a certain amount of time has passed after the event that took place in the electrical grid, specifically when the secondary effects of the consumer-end load shedding in the electrical grid can be measured and evaluated in the form of the changing rotation speed and the acceleration in the electricity generating installation. It is therefore impossible to initiate suitable measures at an early stage, and to switch the electricity generating installations to a safe operating state, matched to the situation. The reaction of the electricity generating installations, which is therefore (too) late in consequence leads to the electricity generating installations being switched off in a partially uncontrolled manner, not matched to the situation, with partially uncontrolled effects on the electrical grids ("blackouts") linked to high financial losses (production failure, wear).

A further method and an apparatus for detection of load shedding are known from the document DE-A1-103 28 932. In this document, the principle for detection of load shedding in the electrical grid is to measure the (alternating) frequency of the AC voltage produced by the generator. This is compared with a predetermined maximum frequency. The acceleration is derived as an additional variable by detecting the frequency over time. This is compared with a predetermined maximum acceleration value. Additional items also take account of:
a) the power (load) of the rotating machine at the time of load shedding for calculation of the load-dependent maximum acceleration value,
b) the state of the rotating machine below or above the minimum electrical power, and
c) the connection and disconnection of the rotating machine to and from the supply grid.

The frequency of the AC voltage produced by the generator is directly proportional to the rotation speed of the rotor of the rotating machine. It is therefore completely irrelevant whether the rotation speed of the rotor of the rotating machine or the frequency of the AC voltage produced by the generator is measured. This means that the rate of change of both variables depends equally on the inertia of the rotor of the rotating machine, and is therefore a "slow" variable. This "dependency on the inertia of rotating masses" represents a major time disadvantage for early or "anticipatory" detection of load shedding in the electrical grid. Furthermore, various disturbances in the grid, such as transient processes, can greatly corrupt a frequency measurement, and the methods based thereon therefore lead to incorrect conclusions.

SUMMARY OF THE INVENTION

An aspect of the invention is therefore to specify a method for early detection and anticipatory control of consumer-end load shedding in electrical grids, which overcomes the disadvantages of previous methods and is distinguished in particular by a rapid and case-specific reaction and allows matched action on the electricity generating side, as well as specifying an apparatus for carrying out the method.

In the solution currents and voltages are measured between the at least one generator and the single-phase or polyphase electrical grid and/or in the electrical grid, and that one or more signals is or are derived from the measured currents and voltages and is or are used for action on the at least one rotating machine.

One refinement of the method according to invention is characterized in that the at least one rotating machine has a regulator for the emitted power, and in that the derived signals are emitted to the regulator of the at least one rotating machine in order to influence the power output of the at least one rotating machine in the event of load shedding in the grid, such that the generation of and demand for electrical power can be quickly matched again.

Another refinement is distinguished in that one or more electrical variables is or are derived from the measured currents and voltages, in that the rate of change or the gradient over time of these and/or further variables is calculated from the derived electrical variables, and in that the signals are produced for action on the at least one rotating machine as soon as one or more of the calculated rates of change overshoots or undershoots a respectively associated threshold value.

In particular, the derived electrical variables comprise the real power, the real current and the reactive power or the reactive current, and the calculated rates of change or gradients over time comprise the real power gradient, the real current gradient, the reactive current gradient or the reactive power gradient and the rotation speed gradient. In the exemplary embodiment which will be explained later, the derived electrical variables comprise the real power, the real current and the reactive current. However, it is also possible to use the reactive power, rather than the reactive current, for evaluation.

Another refinement of the method according to the invention is characterized in that appropriate threshold value signals are formed by comparison of the calculated gradients and of the reactive current or the reactive power with associated threshold values, and in that the threshold value signals are logically linked to one another in an evaluation unit in order to produce the signals for action on the at least one rotating machine.

A further refinement is distinguished in that the at least one rotating machine is a turbine whose power output can be controlled via an actuator, and in that the signals for acting on the turbine are passed to a regulator, to which the actuator is connected.

In this case, the turbine may be a steam turbine and the actuator may control the supply of steam to the turbine. The steam supply to the turbine is in this case influenced via a regulator and the actuator (main inlet valve and/or bypass valve).

However, the turbine may also be part of a gas turbine, and the actuator may control the supply of fuel and/or combustion air to the gas turbine. In this case, a regulator influences the combustion process in the combustion chamber of the turbine via the actuator (fuel valve and/or air flow-rate regulation/variable row or rows of inlet guide vanes).

A further refinement of the method according to the invention is characterized in that the signals for acting on the turbine are amplified in an output stage before being passed on to the regulator.

It is also advantageous if all of the electrical variables which are required to detect load shedding as well as a rotation speed gradient, which is "to be expected" or is "fictitious", of the rotor of the at least one rotating machine is obtained from a single-phase or polyphase measurement of the voltage and current in the single-phase or polyphase electrical grid.

Preferably, an acceleration to be expected is calculated from the instantaneous power and the mass moment of inertia of the rotor of the at least one rotating machine.

Another refinement of the invention is characterized in that a plurality of generators, which are each driven by at least one rotating machine, are connected to the single-phase or polyphase electrical grid, and in that signals derived from the measured currents and voltages are selectively used to influence the power generated by the rotating machines in reaction to load shedding in the single-phase or polyphase electrical grid.

The apparatus according to the invention for carrying out the method comprises current transformers and voltage transformers which are arranged between the at least one generator and the single-phase or polyphase electrical grid, and/or are arranged at selected points in the single-phase or polyphase electrical grid, and are connected on the output side to at least one apparatus for detection of load shedding, the output of which apparatus is operatively connected to the at least one rotating machine.

One refinement of the apparatus according to the invention is characterized in that the at least one rotating machine is a turbine, whose power output can be controlled via an actuator, and in that a regulator is arranged between the output of the at least one apparatus for detection of load shedding and the actuator of the turbine.

A further refinement is distinguished in that the at least one apparatus for detection of load shedding has a measured value preprocessing unit whose input side detects the currents and voltages recorded by the current transformers and voltage transformers and which, on the output side, emits the real power derived therefrom, the real current and the reactive current or the reactive power, in that arithmetic units are arranged downstream from the measured value preprocessing unit and use the values emitted from the measured value preprocessing unit to calculate the rates of change or the gradients over time of the rotation speed, real power, real current and reactive current or reactive power, in that an associated threshold value transmitter is in each case arranged downstream from the arithmetic units and emits a corresponding threshold value signal when a threshold value is overshot or undershot, and in that the threshold value signals are supplied to a downstream evaluation unit which, on the basis of the threshold value signals, emits at its output a load reduction signal in order to influence the at least one rotating machine.

In particular, the reactive current emitted by the measured value preprocessing unit or the emitted reactive power is supplied directly to a further threshold value transmitter, whose output is connected to the evaluation unit.

Advantageously, an output stage for amplification of the load reduction signal can be connected downstream from the evaluation unit.

BRIEF DESCRIPTION OF THE DRAWINGS

The invention will be explained in more detail in the following text using exemplary embodiments and in conjunction with the drawing, in which.

DETAILED DESCRIPTION

The invention describes a method and an apparatus for detecting consumer-end load shedding considerably earlier than in the case of the prior art and for anticipatory control thereof in an electrical grid. A further advantage of the invention is that, when a disturbance occurs in the electrical grid caused by a sudden drop in power at the consumer end, it is possible to distinguish whether this is a load reduction which is relevant at the electricity generating installation end (interruption in the transmission line, consumers being switched off, etc.) or is a load reduction which is not relevant at the electricity generating installation end (short circuit, ground fault in the grid, brief interruption etc.). Furthermore, the severity of the disturbance in the electrical grid can be detected, thus allowing a reasonable reaction to the situation.

The need for a total or partial load reduction on one or more rotating electricity generating installations can be derived solely from the measurement of electrical variables, and this is possible at a considerably earlier time than that in the prior art to date by measurement of the rotation speed and/or the acceleration of the rotating electricity generating installation. The reliable and considerably earlier detection of events in an electrical grid which relevant to the electricity generating installations allows countermeasures to be taken considerably more moderately and possibly in stages. This in turn reduces the load on the installation.

The invention therefore protects not only the electricity generating installation but also the electrical grid.

Figure 3:
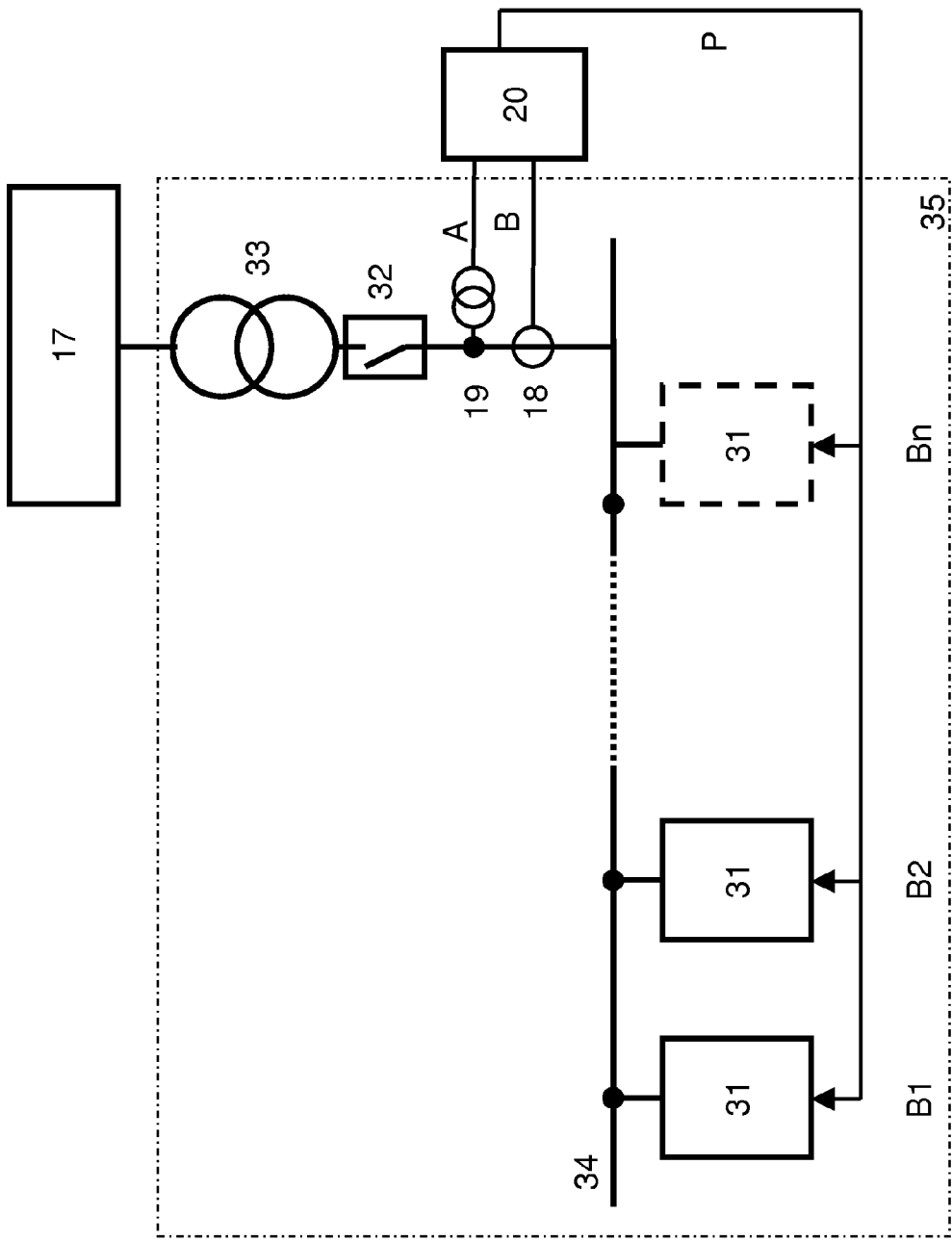
FIG. 3 shows a further option, within the scope of the invention, in a power station which comprises a plurality of power station blocks, for measuring currents and voltages which are required for the method and for feeding back the amplified load reduction signal to the regulator for the individual power station blocks.
Figure 4:
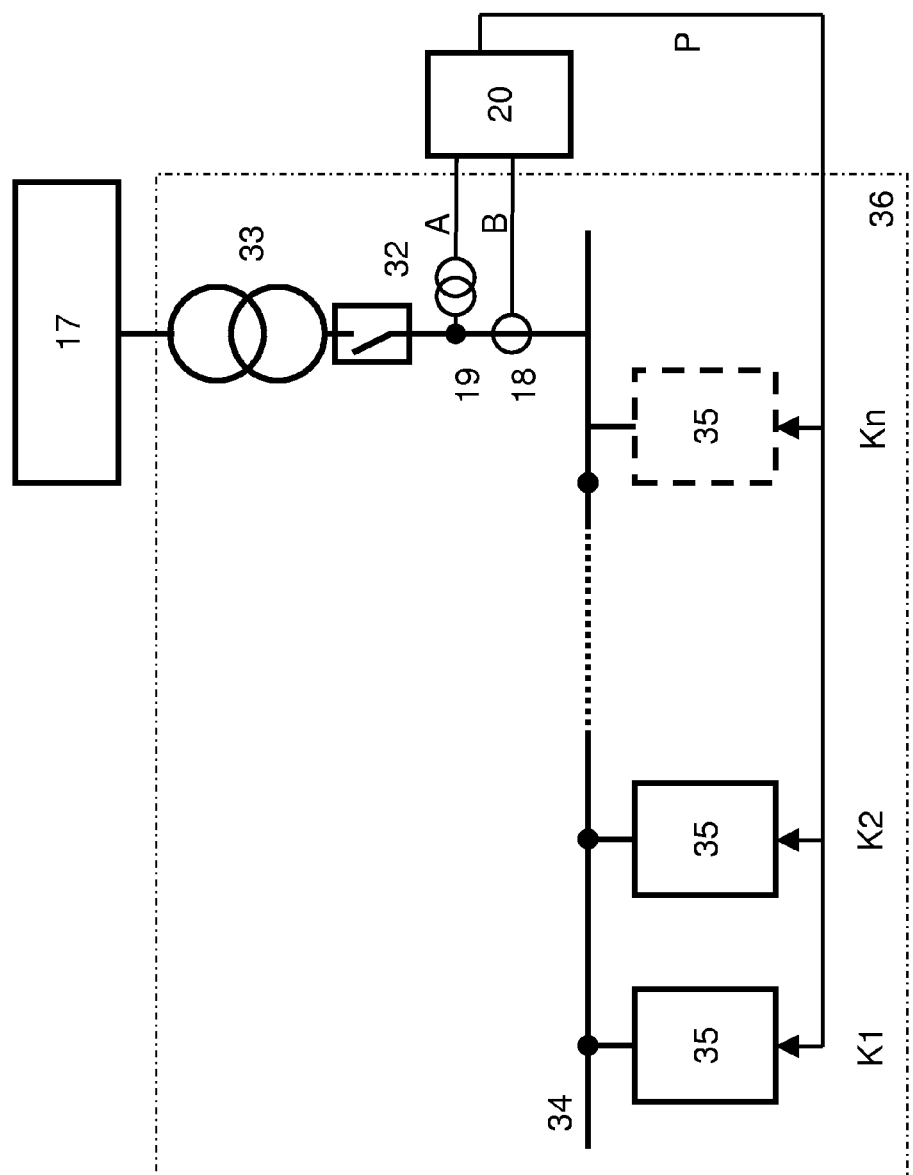
FIG. 4 shows an example of an option, within the scope of the invention, in a power station system which comprises a plurality of power stations, for measuring currents and voltages which are required for the method and for feeding back the amplified load reduction signal to the regulator or regulators for the individual power station blocks.

As will also be explained further below with reference to the figures, the electrical variables voltage and current can be measured at widely differing points in the electrical grid or between the generators and the grid, for example:

before and after the switch or before and after the main transformer of a block of an electricity generating installation or a power station (see FIGS. 2a . . . 2d), after the outgoer from an electricity generating installation or power station comprising a plurality of blocks (see FIG. 3), within an electrical grid which is fed by a plurality of electricity generating installations (power station system) (see FIG. 4).

Depending on the point where the electrical variables are measured in the electrical grid, and the number and structure of the electricity generating installations (the number of power stations, the number of power station blocks per power station, etc.), the apparatus according to the invention for detection of load shedding can produce one or more signals relating to the nature and magnitude of the load reduction for one or more blocks of an electricity generating installation and/or for one or more electricity generating installations. The apparatus can also supply a plurality of signals for a single block of an electricity generating installation, for example for step-by-step load disconnection (load reduction) corresponding to the level of load shedding in the electrical grid.

The apparatus according to the invention for detection of load shedding makes it possible to distinguish, for electricity generating installations, between:

events which are relevant for load disconnection or load reduction, and events which are not relevant for load disconnection or load reduction.

In the case of an event which is relevant for load reduction in the electrical grid, the reaction may be a load reduction as a sudden change or step-by-step.

With respect to the power level, the load reduction may relate to partial load, island operation, own consumption of the block or of the power station, no load or shut down (zero).

Depending on the nature of the rotating machine, a load reduction can be implemented, for example, by:

controlled reduction of the fuel supply in the case of internal combustion engines or gas turbines, controlled reduction in the steam supply in the case of steam turbines (see FIG. 5), controlled reduction in the water supply in the case of hydroelectric power stations, controlled switching from turbine mode to pump mode in pump-storage power stations, controlled reduction in the air supply for air turbines, or controlled regulation or disconnection in the case of wind energy converters or sea current turbines.

In general, the "controlled reduction" can be carried out by means of a "power-relevant actuator". The most normal form is direct action via a valve (fuel, steam, water, . . . ) in the supply line to the rotating machine. By way of example, in the case of gas turbine installations, it is possible not only to reduce the fuel mass flow through the fuel valve by means of so-called variable compressor inlet guide vanes (VIGV) but also to reduce the air mass flow (see FIG. 6).

However, the load can also be reduced indirectly via an actuator in a bypass line of the rotating machine. For example, steam turbine installations have bypass lines which can pass the steam around the steam turbine. In the case of wind energy converters or sea current turbines, the action can be carried out, for example, by adjusting the pitch angle of the rotor blades (see FIG. 7).

Figure 1:
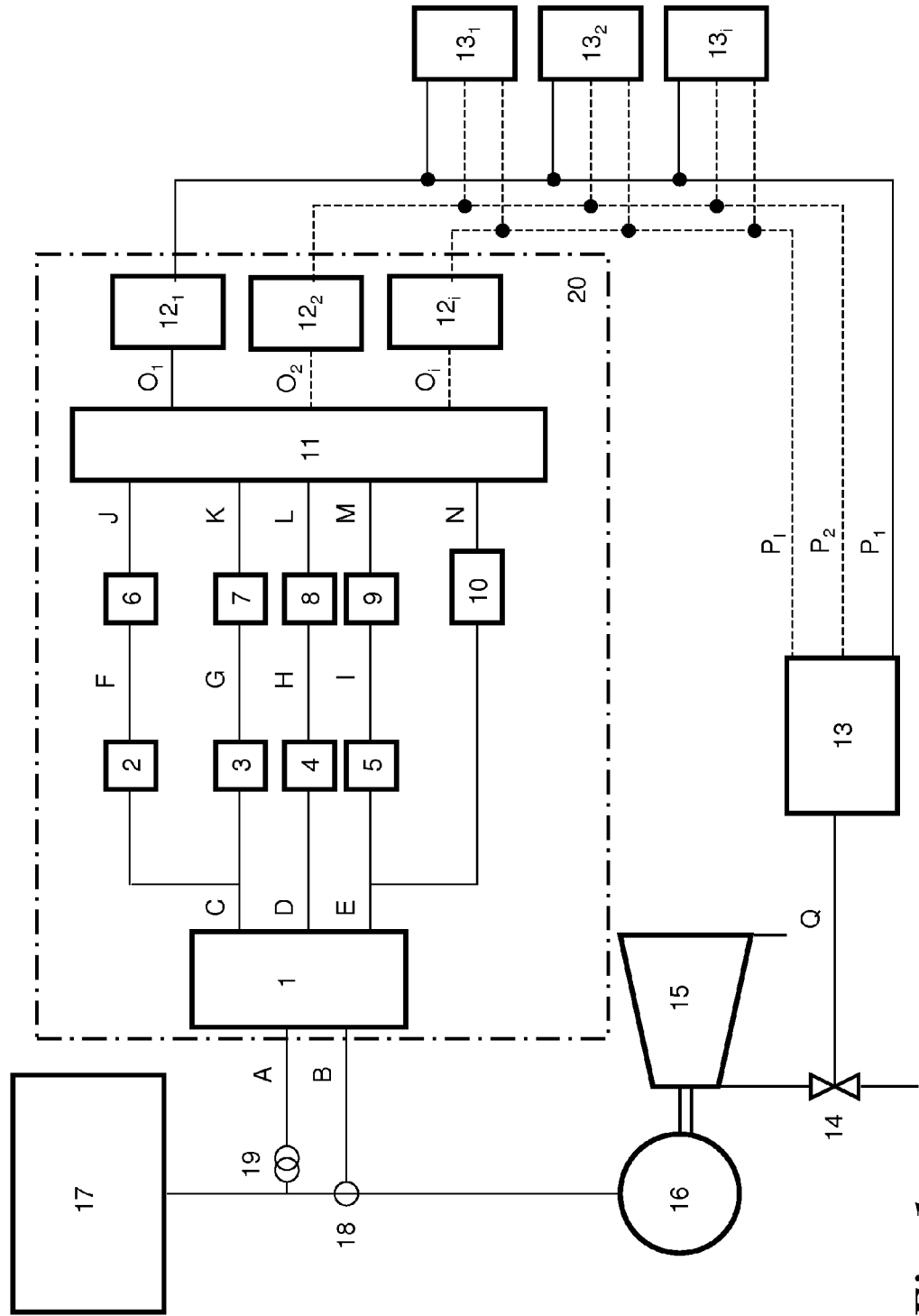
FIG. 1 shows a highly simplified block diagram of an electricity generating installation having an apparatus for detection of load shedding, and which is used to control the rotating machine, according to one preferred exemplary embodiment of the invention.

FIG. 1 shows a highly simplified block diagram of a power generating installation having an apparatus which is used to control the rotating machine for detection of load shedding, according to one preferred exemplary embodiment of the invention. At least one turbine 15 is used to generate power, in particular in the form of a steam turbine, which is supplied with steam via an actuator (in this case: a controllable turbine valve) 14. The at least one turbine 15 drives a generator 16 which produces thee-phase electricity and feeds an electrical grid 17 via appropriate connecting lines. When load shedding is carried out at the consumer end in this grid 17, the aim is to detect this load shedding at an early stage by means of an apparatus 20 for detection of load shedding, in order that the at least one turbine 15 can be influenced such that the consequences of the load shedding are coped with safely, without unnecessarily adversely affecting the grid supply.

The apparatus 20 for detection of load shedding receives its input signals from current transformers 18 and voltage transformers 19, which are arranged in the phases or between the phases of the connecting lines. The voltage measured values A and current measured values B emitted from the voltage transformers 19 and current transformers 18 are supplied in the apparatus 20 to a measured value preprocessing unit 1, which uses the measured values A and B to derive values for the real power (C), the real current (D) and the reactive current or the reactive power (E), and makes these available on the output side.

These three output values C, D and E are supplied on the one hand to downstream arithmetic units 2, 3, 4 and 5, which use them to calculate gradient signals (rates of change) of the rotation speed (F), of the real power (G), of the real current (H) and of the reactive current or the reactive power (I). The gradient signals F, G, H, I and the reactive current or reactive power E are supplied as input signals to threshold value transmitters 6, 7, 8, 9 and 10. The threshold value signals J, K, L, M and N of all the threshold value transmitters 6, 7, 8, 9, and 10 are finally processed in a downstream evaluation unit 11, with appropriate logic. When consumer-end load shedding is detected, the evaluation unit 11 outputs an appropriate load reduction signal O at the output, which signal is amplified in an output stage 12. The amplified load reduction signal P is then passed to the regulator 13, which uses a manipulated variable signal Q to appropriately control the steam supply to the turbine 15 via the actuator 14, in order to quickly and safely cope with the consequences of the load shedding.

Further manipulated variable signals Qi can be emitted to the same actuator with different values or to other actuators of the turbine 15, or to another rotating machine. The dashed lines passing to the regulator 13 indicate that, in addition to the amplified load reduction signal P, further amplified load reduction signals Pi can be input to the regulator 13, which originate from load reduction signals Oi which are derived from other threshold values. The same load reduction signals P1, P2, . . . Pi can be supplied simultaneously to one or more regulators 13.

It is self-evident that, instead of the steam turbine 15, other rotating machines, for example a gas turbine, a water turbine, a wind energy converter, a sea current turbine, an internal combustion engine, an air turbine or the like, may be used, in which a power reduction or power disconnection takes place in a different way and by means of other actuators.

In this case, the advantage of the present invention is actually the use of electrical variables A, B, which are detected exclusively—independently of mechanical inertias—and without delay for detection of load shedding in the electrical grid 17. All the electrical variables which are required for detection of load shedding, as well as a rotation speed gradient which is "to be expected" or is "fictional" are obtained from a single-phase or polyphase measurement of voltage and current.

The calculation of the acceleration to be expected, which corresponds to the rotation speed gradient, is carried out from the instantaneous power and the mass moment of inertia of the shaft of the rotating machine, or from the sum of the powers and moments of the rotating machines.

Minimal loads need not be checked, because these are already taken into account in the instantaneous powers. In addition, there is no need to deactivate the apparatus when the rotating machine or rotating machines is or are not connected to the grid 17.

The major advantage of the proposed solution is actually that load shedding is detected considerably earlier than in the prior art, even before the event can result in a measurable frequency change. More time is therefore available for suitable measures (in particular for controlling the rotating machine). In addition, the required magnitude of the change in the load reduction of the rotating machine can be used to make a statement to once again improve the measure for stabilization of the rotating machine.

Furthermore, the evaluation of the calculated variables makes it possible to reliably detect states in the grid 17 which are not due to load shedding, but have a similar effect on the behavior of the rotating machine.

For example, a short circuit in the grid 17 likewise leads to rotor acceleration and therefore to a rise in the frequency. However, in this situation, the generator 16 should continue to feed into the grid 17 for a short time period as far as possible without any action by the turbine regulator 13, in order to allow the short circuit to be located and disconnected here. The method proposed here likewise "detects" this situation, for example, from the measured electrical variables (assessment of the reactive current component or reactive power component).

Furthermore, the method is based on the evaluation of straight lines and not of absolute values, and the "special treatment" of partial load situations is therefore obsolete with respect to solutions known from the prior art.

Figure 2:
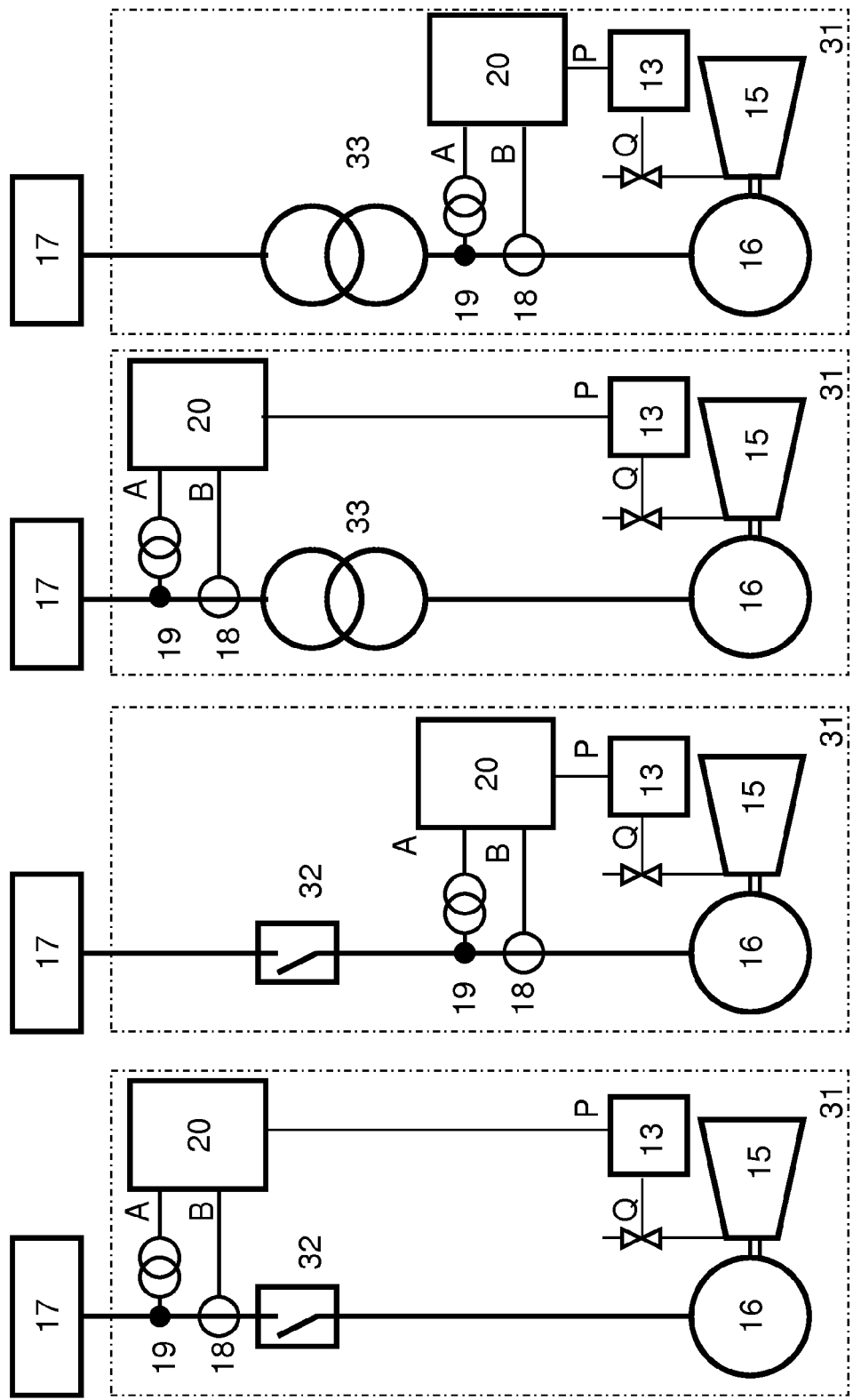
FIGS. 2 a-d show various examples of options within the scope of the invention in a power station block between the generator and the grid, a busbar or switchgear assembly, for measuring currents and voltages which are required for the method and for feeding back the amplified load reduction signal to the regulator for the individual power station blocks.

FIGS. 2a-2d show various examples of arrangements of the measurement points of current transformers 18 and voltage transformers 19 which are suitable for carrying out the invention, in a power station block 31 which comprises a generator 16 and is equipped with a switch 32 (FIGS. 2a, 2b) or with a transformer 33 (FIGS. 2c, 2d). In FIG. 2a, the voltage A and current B are measured on the grid side of the switch 32, and in FIG. 2b on the generator side. In FIG. 2c, the voltage A and current B are measured on the grid side of the transformer 33, and in FIG. 2d on the generator side. The transformers 18 and 19 can, of course, also be arranged directly been the generator 16 and the grid 17 (see FIG. 1) or at any desired point in any desired arrangement of switches 32 and transformers 33. All that is necessary is to ensure that the measurements A and B virtually completely reflect the power response of the generator 16. The measured voltages A and currents B are in all cases supplied to an apparatus 20 for detection of load shedding, which emits an amplified load reduction signal P to a regulator 13 for the turbine 15 when an event occurs. The regulator 13 then influences the power output of the turbine 15 and/or of the generator 16 via an actuator 14, by means of a manipulated variable signal Q.

FIG. 3 shows a further example of an arrangement of the measurement points which is suitable for carrying out the invention in a power station 35 which comprises a plurality of power station blocks 31 or B1, . . . Bn, which operate on a busbar or switchgear assembly 34. In this case, the current transformer 18 is arranged between the busbar or switchgear assembly 34 and the switch 32, and the voltage transformer 19 can be arranged directly on the busbar or switchgear assembly 34, or the grid outgoer. However, the arrangement can also be provided between the switch 32 and the transformer 33, or the transformer 33 and the grid 17, or between the power station 35 and the grid 17, or at any desired point in any desired arrangement of switches 32 and transformers 33. An amplified load reduction signal P is produced from the measured values A and B in an apparatus 20 for detection of load shedding, and is fed back into the power station blocks 31 or B1, . . . , Bn.

FIG. 4 shows a further example of an arrangement of measurement points which is suitable for carrying out the invention in a power station system 36 which comprises a plurality of power stations 35 or K1, . . . , Kn which operate on a busbar or switchgear assembly 34. The current transformer 18 is in this case once again arranged between the busbar or the switchgear assembly 34 and the switch 32, and the voltage transformer 19 can be arranged directly on the busbar or switchgear assembly 34, or on the grid outgoer. However, the arrangement can also be provided between the switch 32 and the transformer 33 or transformer 33 and grid 17, or between the power station system 36 and the grid 17, of at any desired point in any desired arrangement of switches 32 and transformers 33. An amplified load reduction signal P is produced from the measured values of A and B in an apparatus 20 for detection of load shedding, and is fed back into the power stations 35 or K1, . . . , Kn.

It is merely necessary to ensure that the load reduction signal P or the load reductions signals P1, P2, . . . , Pi are fed back to the regulator 13 for the rotating machines in the power station block 31 or the power stations 35 or the power station system 36 whose total powers emitted to the grid 17 are detected by the voltage measurement A and current measurement B.

If current measurements and voltage measurements are carried out at different points and load reduction signals Oi are derived from them, then these signals can be logically linked on the basis of the grid structure in order to act in a predetermined manner on selected power station blocks 31 and/or their rotating machines.

Figure 5:
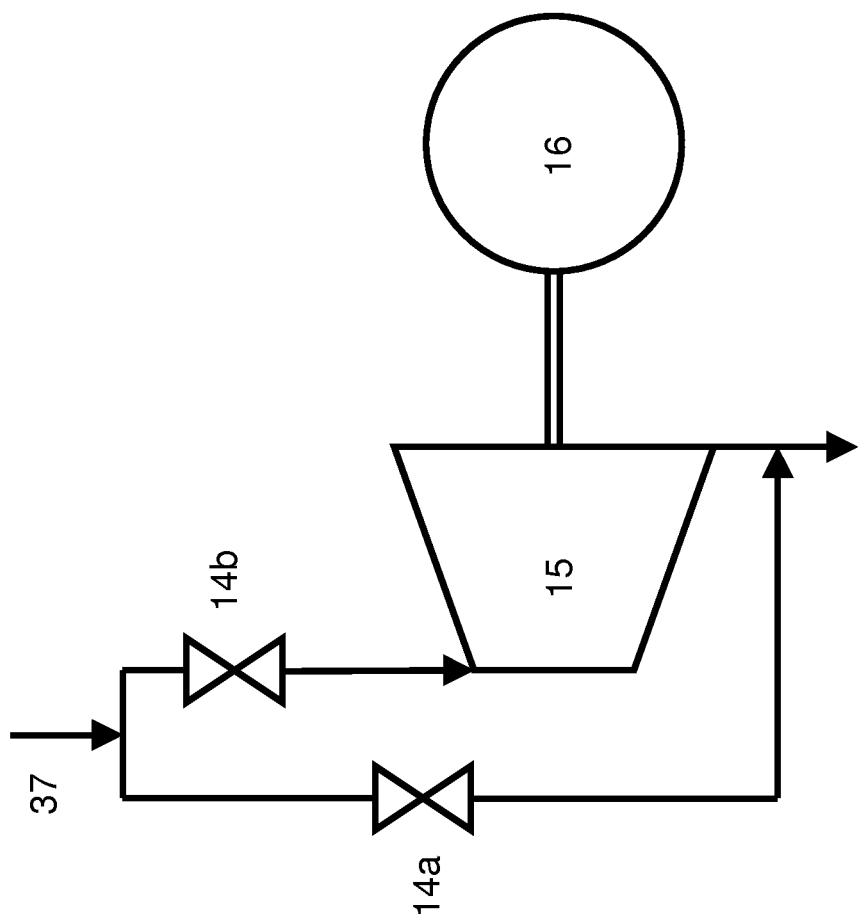
FIG. 5 shows an example of the influence of a load reduction signal P on the control loop of a steam turbine.

FIG. 5 illustrates the action which is possible for load reduction on a steam turbine 15 which drives a generator 16. The turbine 15 receives steam 37 via an actuator/main inlet valve 14b. A further actuator/bypass valve 14a is used for steam to bypass the turbine 15 when required, to the output of the turbine 15. Both actuators 14a, b can be used in a suitable combination or in their own right to implement a load reduction signal O.

Figure 6:
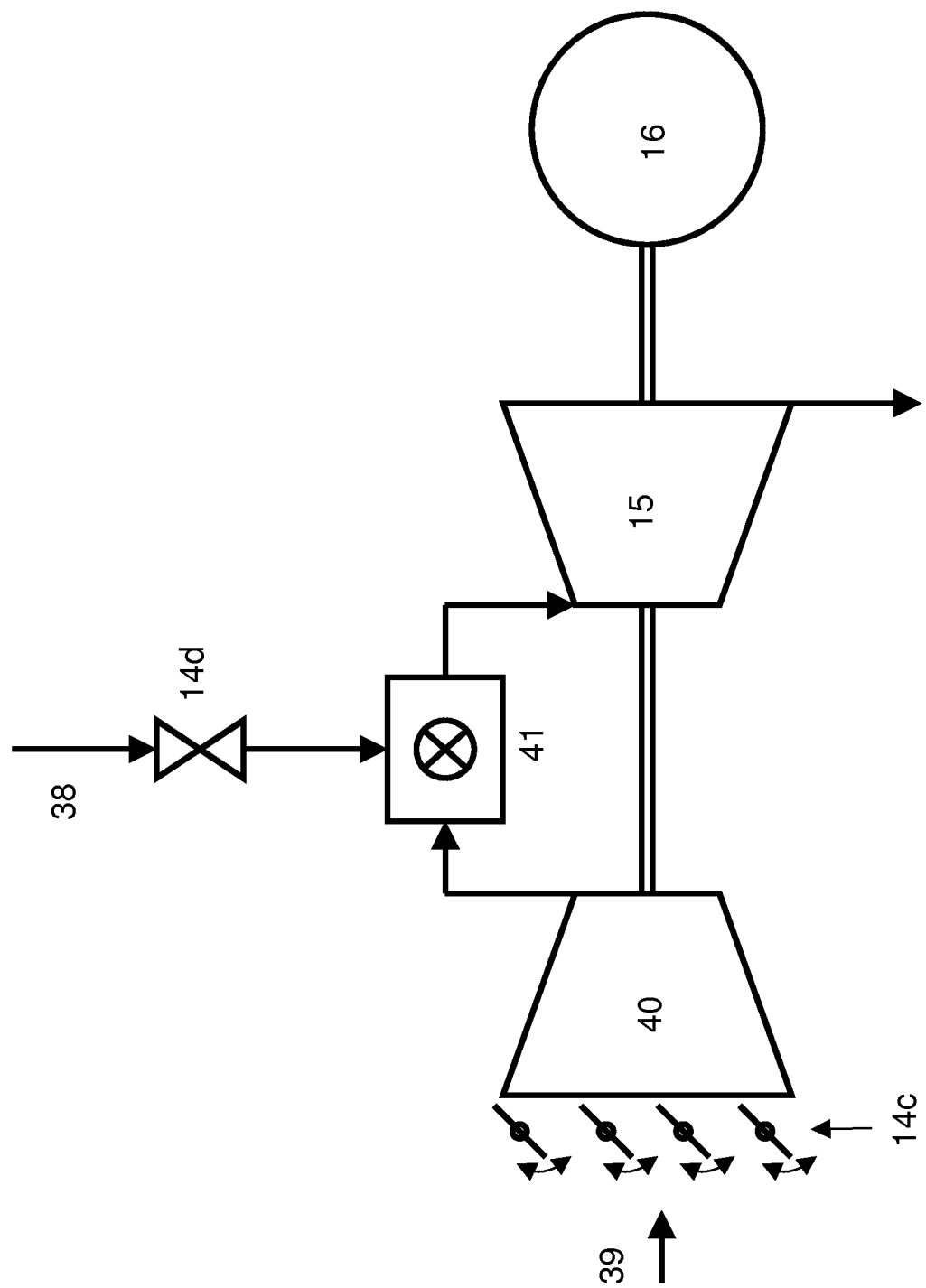
FIG. 6 shows an example of the influence of a load reduction signal P on the control loop of a gas turbine.

FIG. 6 illustrates the action which is possible for load reduction on a gas turbine 15 which drives a generator 16. In the case of the gas turbine 15, a compressor 40 sucks in air 39 via an actuator/adjustable inlet guide vanes 14c, and compresses it. The compressed air is passed on to a combustion chamber 41, where it is used for burning a fuel 38, which is supplied via an actuator/fuel valve 14d. The hot gas that is created during this process is expanded in the turbine 15, creating work. In this case as well, both actuators 14c, d can be used in a suitable combination or in their own right to implement a load reduction signal O.

Figure 7:
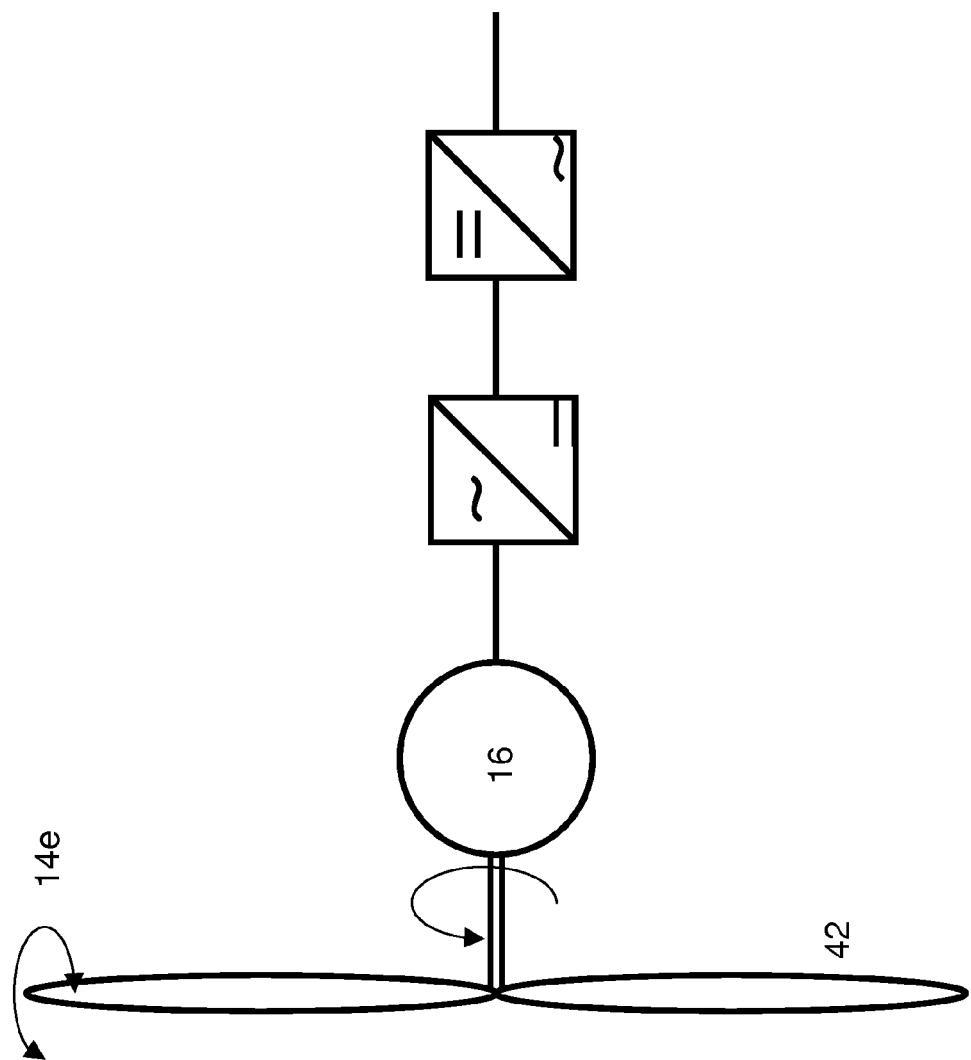
FIG. 7 shows an example of the influence of a load reduction signal P on the control loop of a wind energy converter or of a sea current turbine.

FIG. 7 finally shows a wind energy converter or a sea current turbine having a rotor 42, the pitch of whose blades can be varied by means of an actuator/blade angle adjustment 14e. The driven generator 16 is connected to the grid via suitable power electronics fitted with converters. In this case, the actuator/blade angle adjustment 14e can be used to implement a load reduction signal O.

Summary:

The proposed solution is based exclusively on rapid, undelayed detection of the single-phase or polyphase currents and voltages in electrical grids.

Various derived variables are calculated from the measured variables.

An instantaneous estimate of the accelerations to be expected is produced from the derived real power calculation, taking account of the mass moments of inertia of the rotating machines (before these accelerations occur at all), taking account of the rotating machine operating points actually used as the basis before the event.

The load change to be expected is detected.

Grid situations with characteristics similar to load shedding are detected, taking account of other derived variables, and undesirable tripping of corresponding switching devices is prevented.

LIST OF REFERENCE NUMERALS

1 Measured value preprocessing unit
2 Arithmetic unit (rotation speed gradient)
3 Arithmetic unit (real power gradient)
4 Arithmetic unit (real current gradient)
5 Arithmetic unit (reactive current gradient/reactive power gradient)
6 Threshold value transmitter (rotation speed gradient)
7 Threshold value transmitter (real power gradient)
8 Threshold value transmitter (real current gradient)
9 Threshold value transmitter (reactive current gradient/reactive power gradient)
10 Threshold value transmitter (reactive current/reactive power)
11 Evaluation unit (with corresponding logic)
12 Output stage
13 Regulator
14 (Power) actuator
14a Actuator/bypass valve
14b Actuator/main inlet valve
14c Actuator/variable inlet guide rows
14d Actuator/fuel valve
14e Actuator/blade angle adjustment
15 Rotating machine/turbine
16 Generator
17 Single-phase or polyphase electrical grid
18 Current transformer
19 Voltage transformer
20 Device for detecting load shedding
31, B1, . . . , Bn Power station block
32 Switch (disconnector)
33 Transformer
34 Busbar or switchgear assembly
35, K1 . . . , Kn Power station
36 Power station system
37 Steam
38 Fuel
39 Air
40 Compressor
41 Combustion chamber
42 Rotor
A Voltage
B Current
C Real power
D Real current
E Reactive current/reactive power
F Rotation speed gradient signal
G Real power gradient signal
H Real current gradient signal
I Reactive current gradient signal/reactive power gradient signal
J Threshold value signal (rotation speed gradient)
K Threshold value signal (real power gradient)
L Threshold value signal (real current gradient)
M Threshold value signal (reactive current gradient/reactive power gradient)
N Threshold value signal (reactive current/reactive power)
O, Oi Load reduction signal
P, Pi Amplified load reduction signal
Q, Qi Manipulated variable signal (actuator)

What is claimed is:

1. A method for early detection and anticipatory control of consumer-end load shedding in a single-phase or polyphase electrical grid supplied with single phase or polyphase by at least one generator driven by at least one rotating machine, the method comprising:
   measuring a current and a voltage, the current and the voltage being measured between the at least one generator and the electrical grid, in the electrical grid or at both locations;
   deriving at least one signal from the measured current and voltage;
   using the at least one derived signal and a gradient signal generated from the at least one derived signal to at least partially reduce a load on the at least one rotating machine,
   wherein the at least one derived signal and the gradient signal are sent to a regulator of emitted power of the at least one rotating machine so as to influence a power output of the at least one rotating machine during a load shedding in the grid; and
   subsequently matching a generation of and demand for electric power.

2. The method as recited in claim 1, wherein at least partially reducing the load includes controlling a power output of the at least one rotating machine using an actuator connected to the regulator, wherein the at least one rotating machine is a turbine.

3. The method as recited in claim 2, wherein the turbine is a steam turbine, and wherein the controlling includes controlling a supply of steam to the turbine.

4. The method as recited in claim 2, wherein the turbine is part of a gas turbine, and wherein the controlling includes controlling a supply of at least one of fuel and combustion air to the gas turbine.

5. The method as recited in claim 2, further comprising amplifying the at least one derived signal in an output stage before the at least one derived signal is sent to the regulator.

6. A method for early detection and anticipatory control of consumer-end load shedding in a single-phase or polyphase electrical grid supplied with single phase or polyphase by at least one generator driven by at least one rotating machine, the method comprising:
   measuring a current and a voltage, the current and the voltage being measured between the at least one generator and the electrical grid, in the electrical grid or at both locations;
   deriving at least one electrical variable from the measured current and the measured voltage;
   calculating a rate of change of the at least one electrical variable; and
   using the at least one derived electrical variable and the rate of change of the at least one electrical variable to at least partially reduce a load on the at least one rotating machine,
   wherein the at least one derived signal is used as soon as the calculated rate of change overshoots or undershoots a threshold value.

7. The method as recited in claim 6, wherein the at least one electrical variable includes at least one of a real power, a real current and a reactive power and a reactive current, and wherein the calculated rate of change includes at least one of a real power gradient, a real current gradient, a reactive current gradient, a reactive power gradient and a rotation speed gradient.

8. The method as recited in claim 7, further comprising computing a plurality of threshold value signals by comparing a calculated rate of change of at least one of one of the reactive current and the reactive power with a respective threshold value; and wherein the deriving the at least one signal is performed by logically linking the plurality of threshold signals to one another in an evaluation unit based on a structure of the electrical grid.

9. A method for early detection and anticipatory control of consumer-end load shedding in a single-phase or polyphase electrical grid supplied with single phase or polyphase by at least one generator driven by at least one rotating machine, the method comprising:
   measuring a current and a voltage, the current and the voltage being measured between the at least one generator and the electrical grid, in the electrical grid or at both locations;
   deriving at least one signal from the measured current and voltage; and
   obtaining at least one electrical variable for the detection of the load shedding and a rotation speed gradient of a rotor of the at least one rotating machine from the measured current and voltage; and
   using the at least one electrical variable and the rotation speed gradient of the rotor to generate a load reduction signal for controlling the at least one rotating machine.

10. The method as recited in claim 9, further comprising calculating an expected acceleration from an instantaneous power and a mass moment of inertia of the rotor.

11. A method for early detection and anticipatory control of consumer-end load shedding in a single-phase or polyphase electrical grid supplied with single phase or polyphase by at least one generator driven by a plurality of rotating machines, the method comprising:
   measuring a current and a voltage, the current and the voltage being measured between the at least one generator and the electrical grid, in the electrical grid or at both locations;
   deriving at least one signal from the measured current and voltage; and
   using the at least one derived signal and a gradient signal generated from the at least one derived signal to at least partially reduce a load on each of the rotating machines,
   wherein the plurality of rotating machines are configured to drive a plurality of generators, and
   wherein the at least one derived signal is used to influence power generated by the plurality of rotating machines in response to a load shedding of the electrical grid.

* * * * *